Nov. 15, 1966   C. H. GRAHAM   3,285,085
CHAIN TENSIONING DEVICE
Original Filed Feb. 26, 1963
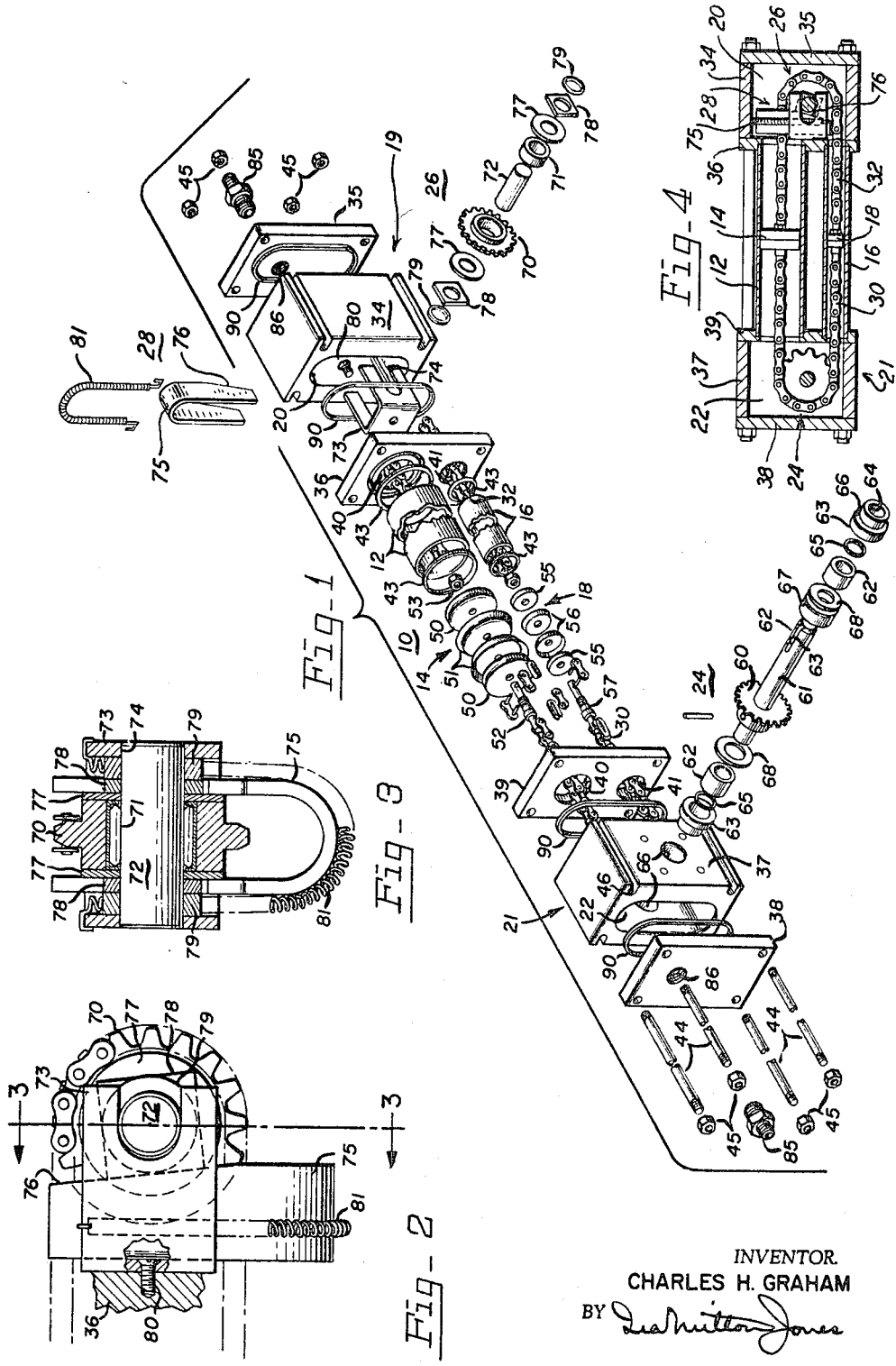
INVENTOR.
CHARLES H. GRAHAM
BY
ATTORNEY

United States Patent Office 3,285,085
Patented Nov. 15, 1966

3,285,085
CHAIN TENSIONING DEVICE
Charles H. Graham, Mountain View, Calif., assignor to Graham Engineering Company, Inc., Palo Alto, Calif., a corporation of California
Original application Feb. 26, 1963, Ser. No. 260,995, now Patent No. 3,217,612, dated Nov. 16, 1965. Divided and this application Jan. 12, 1965, Ser. No. 425,000
3 Claims. (Cl. 74—242.14)

This invention relates generally to chain tensioning means for chain drives, and has more particular reference to a chain tensioning device which is especially adapted for use with power translators of the type disclosed in my copending application Serial No. 260,995, filed February 26, 1963, now Patent No. 3,217,612, and entitled Rotary Actuator Device. This application is a division of said copending application.

The power translator of my aforesaid copending application is similar to that disclosed in my Patent No. 3,121,371, issued February 18, 1964 and entitled, Power Translator. In general, a power translator of this type is in the nature of a two-way mechanism that is characterized by a shaft that can be driven in either direction by fluid pressure actuated means so as to impart rotation to mechanism drivingly connected with the shaft; or torsional input force applied to the shaft can be converted into fluid pressure forces useful for the operation of hydraulic equipment remote from the translator.

The fluid pressure actuated means comprises a piston which can be driven toward a chamber at either end of a double acting power cylinder in response to the admittance of pressure fluid into the chamber at the other end of the cylinder. The piston is drivingly coupled to the shaft by means of a chain drivingly engaged around a pair of sprockets located in the chambers at the opposite ends of the cylinder. One of these is an idler sprocket and the other is fixed to the shaft. One stretch of the chain passes through the power cylinder and is fixed to the piston therein. The other stretch of the chain passes through a chain sealing cylinder that parallels the power cylinder and has a sealing piston therein connected to the chain to more or less provide a link of the chain.

Since power translators of the character described are often employed to very accurately adjust the position of a mechanism driven thereby, it is essential that the chain thereof be free from backlash and held in a taut condition at all times.

It is the purpose of this invention, therefore, to provide a chain tensioning device which is ideally suited for use with power translators of the character described by reason of its ability to maintain the chain of such devices taut under all operating conditions and despite wear that would normally tend to slacken the chain.

It is another purpose of this invention to provide a tensioning device which, though especially adaptable for use with power translators of the character described, can be employed to advantage with any pair of rotatable members that are drivingly connected by a flexible tension element, to maintain the latter taut.

In a more specific sense, it is a purpose of this invention to provide a device for tensioning the flexible drive element connecting a pair of rotatable members, which device is characterized by a more or less floating type support for one of said rotatable members, and a spring loaded wedge which acts upon said support to at all times urge it away from its companion rotatable member and thereby maintain tension on the flexible drive element connecting said rotatable members.

Other objects and a better understanding of the invention may be had by reference to the following description, taken in conjunction with the accompanying drawings, in which:

FIGURE 1 is an exploded perspective view of a rotary actuator or power translator embodying the chain tensioning device of this invention;

FIGURE 2 is an enlarged side view of the tensioning device showing its application to the idler sprocket of the translator;

FIGURE 3 is a sectional view taken along the line 3—3 of FIGURE 2; and

FIGURE 4 is a more or less diagrammatic longitudinal sectional view of the translator shown in FIGURE 1, when assembled.

Referring now to the drawing, in which like reference characters designate like parts, there is shown a rotary actuator 10 generally like that of my Patent No. 3,121,371, dated February 18, 1964. It comprises a power cylinder 12 having a power piston 14 fluid tightly movable therein, a sealing cylinder 16 having a sealing piston 18 fluid tightly movable therein, an upper chamber 19 having its interior 20 communicating the upper end of the power cylinder 12 and sealing cylinder 16, and a lower chamber 21 having its interior 22 communicating the lower end of the power cylinder 12 and the sealing cylinder 16.

The translator 10 further includes a drive sprocket assembly 24 comprising a sprocket 60 mounted inside the lower chamber 21 for rotation about a fixed axis and a driven or idler sprocket assembly 26 comprising a sprocket 70 supported by the tensioning means 28 of this invention for rotation about a laterally movable axle 72 in the upper chamber 19. Lower and upper chains 30 and 32, respectively, cooperate with the pistons 14 and 18 to provide an endless flexible tension element drivingly connecting the sprockets 60 and 70 of the two sprocket assemblies. The lower chain 30 is drivingly engaged over the sprocket 60 of the lower sprocket assembly and has its ends respectively fixed to the adjacent sides of the power piston 14 and sealing piston 18. Similarly, the upper chain 32 is drivingly engaged over the idler sprocket 70 of the upper sprocket assembly and has its ends respectively fixed to the opposite sides of the power piston 14 and sealing piston 18.

The upper chamber 19 is provided by a housing 34, and by cover and communicating plates 35 and 36, respectively, which are bolted to the opposite ends of the housing. Similarly, the lower chamber 21 is provided by a housing 37 and by cover and communicating plates 38 and 39, respectively, closing the opposite ends of the housing. Resilient seal members 90, such as conventional gaskets or O-rings, and interposed between plates 35, 36 and the ends of housing 34, and between plates 38, 39 and the ends of housing 37.

Interposed between communicating plates 36 and 39 and holding the same spaced apart, are power cylinder 12 and sealing cylinder 16. These cylinders are parallel to one another and of equal length but the sealing cylinder is substantially smaller in diameter than the power cylinder. Suitable openings 40 and 41 are provided in communicating plates 36 and 39 to communicate the interiors of chambers 19 and 21 with the bores of the cylinders 12 and 16. Resilient seal members 43 are utilized in a conventional manner to provide fluid tight seals between the ends of the cylinders 12 and 16 and the communicating plates 36 and 39. Openings 40 and 41 are preferably equal in diameter to the bores of their respective cylinders, and are formed in the bottoms of counterbores in the plates 36–39 which are dimensioned to accommodate the end portions of their respective cylinders.

The housings 34 and 37 are clampingly held in place against the opposite ends of the cylinders by four tie bolts 44 which pass through suitable openings in plates 35, 36, 38 and 39, and which have threaded end portions to receive nuts 45. Suitable recesses 46 in the outer sides of the housings may be provided to accommodate the bolts 44.

The construction and method of making the pistons 14 and 18 is disclosed and claimed in my aforesaid copending Serial No. 260,995, filed February 26, 1963, of which this application is a division. Briefly, the power piston 14 is an assembly comprised of a pair of flexible sealing cups 51 of thin metal or plastic material, clamped back to back between a pair of washers 50 by a stud 52 having a shoulder engaging one washer and a nut threaded onto the stud and engaging the other washer.

Similarly, the smaller sealing piston 18 comprises an assembly consisting of a pair of thin flexible sealing cups 56, either of metal or plastic, clamped back to back between a pair of washers 55 by a stud 57.

The ends of chains 30 and 32 are secured to the studs 52 and 57 in a more or less conventional manner.

The drive sprocket 60 is part of an assembly 24 comprising a shaft 61, to which the sprocket is secured in any suitable manner. The shaft is rotatably supported by the housing 37 in a pair of "Oilite" bearings 62 press fitted into a pair of bearing cups 63. To provide a fluid tight seal between the shaft 61 and the bearing cups 63, the latter are provided with inner shoulders 64 facing the sprocket 60, and resilient seal members 65, such as O-rings, are placed into the bores of the bearing cups and against their shoulders 64. Thereafter, bearings 62 are press fitted into the cups and against their seal members 65. In this manner, the seal members 65 are firmly held in place and the shaft 61 is fluid tightly sealed to bearing cups 63.

Bearing cups 63 are press fitted into bores 66 in the housing 37 from the inside thereof to seat firmly with external shoulders 69 thereon against the inner sides of the housing side walls. A spacer member 67 and a pair of spacer washers 68 on the shaft 61 serve to position the drive sprocket 60 in the interior of the housing 37 with the pitch diameter of the sprocket substantially tangent to the axes of cylinders 12 and 16.

One end portion 100 of the shaft 61 projects to the exterior of the housing 37 and has a keyway 101 therein to provide for coupling the shaft either to a source of power, such as a prime mover, or to mechanism to be actuated by the translator.

The idler sprocket 70 is part of assembly 26 and is freely rotatably mounted on an axle 72 by means of an "Oilite" bearing 71 which is press fitted into the hub of the sprocket. Like the drive sprocket 60, the idler sprocket 70 is also supported with its pitch diameter substantially tangent to the axes of the power and sealing cylinders.

Of course, instead of utilizing "Oilite" bearings 62 and 71 for the shaft 61 and axle 72, other types of bearings such as conventional needle or ball bearings or the like may be employed if desired.

For the purposes of this invention, the axle 72 for idler sprocket 70 is supported by the tensioning device 28. This tensioning device comprises a U-shaped bracket that provides a take-up yoke 73, and a U-shaped take-up wedge 75. The bight portion of the yoke is seated against the housing side of the communicating plate 36, to which it is secured by means of a screw 80, or the like, with its arms projecting into the housing 34 and disposed at opposite sides of a plane containing the axes of the cylinders 12 and 16. Opposite slots 74 in the arms of the yoke slidingly and guidingly receive opposite end portions of the axle 72, and extend lengthwise of the axes of the cylinders so as to permit the axle to move bodily transverse to its axis, toward and from the drive sprocket 60.

The U-shaped take-up wedge 75 is dimensioned to be received by the yoke 73, between the slotted arms thereof, and it has spaced apart opposite legs which flatwise oppose the inner sides of the yoke arms and which extend transversely to the axle 72. The wedge legs have straight edges which bear against the bight portion of the yoke, and inclined edges 76 which oppose the axle 72 and engage straight surfaces on take-up shoes 78 on the axle. Washers 77 are interposed between the take-up shoes 78 and the idler sprocket 70, and other washers or spacers 79 are interposed between the take-up shoes and the yoke arms to hold the shoes properly engaged with the inclined edges 76 on the take-up wedge 75.

With the construction described, the device 28 in effect provides a sort of floating bearing for the axle 72, enabling the axle and sprocket 70 thereon to occupy positions spaced different distances from the drive sprocket 60 depending upon the position of the take-up wedge 75 relative to the bracket or yoke 73. Thus it will be seen that if the take-up wedge 75 is moved lengthwise in the direction to bring its bight portion toward the bracket or yoke 73, more or less causing the shoes 78 to ride up the incline on the wedge, it will exert a camming action on the axle 72 through the shoes 78 thereon to move the axle and idler sprocket thereon away from the drive sprocket 60. According to this invention, the take-up wedge is biased to move in said direction by means of a tension spring 81 having an intermediate portion wrapped around the bight of the wedge and having opposite ends anchored to the take-up yoke or bracket 73. Consequently, the take-up wedge is constantly urged inwardly of the bracket, in the direction to cam the axle and idler sprocket thereon away from the drive sprocket 60, to thereby maintain tension on the chains 30 and 32, so that the latter will at all times be taut. Since the tension on the chains is more or less determined by the biasing force exerted on the take-up wedge 75 by the spring 81, such tension can be readily varied merely by replacing the spring with one having either greater or lesser restoring force when connected with the wedge in the manner described.

It is noteworthy that the tensioning device 28 of this invention is capable of performing its chain tensioning function with only a relatively light spring force acting upon the take-up wedge 75. This is possible because of the gentle taper on the surfaces 76 of the wedge, which are so inclined that the wedge will have no tendency to be backed out of its operative chain tensioning position under the influence of a load on the chains during operation of the translator, but will readily move inwardly by the action of the spring thereon if any slackness in the chain tends to develop.

When the shaft 61 of the translator is utilized as an output shaft, to transmit rotation to mechanism drivingly coupled thereto, both power piston 14 and the sealing piston 18 are simultaneously subjected to pressurized actuating fluid introduced either into chamber 19 or 21. Fittings 85, together with threaded openings 86 in the end plates 35 and 38 provide for the introduction and/or the exhaust of pressure fluid from these chambers. Both chambers 19 and 21 can be connected, through fittings 85, in a hydraulic fluid system through a suitable control valve so that pressure fluid can be directed into either chamber and simultaneously exhausted from the other chamber.

The effect of the simultaneous subjection of both pistons to pressure fluid admitted into either chamber is that both tend to be driven toward the other chamber. Since the two pistons are connected by the chains, however, they cannot both move in the same direction. Accordingly, the power piston 14, having a much larger area than the sealing piston 18, becomes the driving piston and carries the sealing piston along with it, but in the opposite direction. Since the useful power developed by the translator 10, when utilized to translate hydraulic pressure into rotation of the output shaft 61, is equal to the total force on the power piston less the total force on the sealing piston, the ratio of their respective areas, with a power piston of given diameter, should be as large as possible. Hence, because the only function of the piston 18 is to provide a fluid tight return path for the chains connected to the opposite sides of the power piston 14, the sealing piston is ordinarily made as small as practicable in order to enhance the efficiency of the translator.

As the power piston moves under the force of pressure fluid acting upon one side thereof, it moves the chains which, of course, are held taut by the tensioning device 28 of this invention. Movement of the chains, in turn, produces rotation of the output shaft 61 and the latter thus drives whatever mechanism is drivingly coupled to it.

The importance of maintaining the chain drive in the translator 10 taut at all times is especially vital in cases where the shaft 61 is used as an input for the translator, to which torque is applied as from a prime mover, and the same angular motion of the shaft 61 is to be imparted to the output shaft of a second translator that may be remote from the prime mover. In such cases, input torque on the shaft 61 causes the power piston 14 to move toward one of the chambers 19 or 21 to pressurize the fluid therein, and such pressurized fluid is conducted into one of the chambers of the second translator to move its power piston and accordingly effect rotation of its output shaft in one direction. The remaining chambers of the two translators, of course, are also communicated with one another to complete a closed hydraulic circuit for the two translators.

Obviously, if there were any slack in the chain drive between the sprockets of either translator, there would be a degree of lost motion in the coupling between their operating shafts proportional to the slackness of the chain, and in that event, the driven shaft could never be rotated the same angular extent as the driving shaft. The chain tensioning device 28 of this invention, however, always maintains the chains properly tensioned, to thus assure rotation of both shafts in unison and through the same angle of rotation, as long as there is no leak in the closed hydraulic circuit interconnecting the translators.

Similarly, the tensioning device 28 at all times functions to preclude backlash or lost motion in the driving connection between the power piston and the shaft 61, both when the latter is used as the translator output as well as when it is employed as the input and hydraulically operated instrumentalities are driven by the pressure resulting from movement of the power piston. In such cases, if there is slackness in the chain, there will be times when there is no load on the power piston and it will be accelerated rapidly while the slackness is taken out of the chain, but will be abruptly slowed as it picks up the load driven by the translator. If it were not for the tensioning device 28, this could produce sudden high shock forces which would either break the chain or otherwise damage the translator.

From the foregoing description together with the accompanying drawing, it will be readily apparent to those skilled in the art that this invention provides a simple but efficient device for tensioning the flexible drive element connecting two rotatable members, and that its compactness renders it especially useful for maintaining tension on the chains of power translators of the type disclosed herein.

What is claimed as my invention is:

1. Means for adjustably supporting a rotatable driven member for bodily motion in one direction along a path normal to its axis so as to provide for tensioning of a flexible element by which said driven member can be drivingly connected with a rotatable driving member, comprising:

A. means connected with said rotatable driven member defining an axle therefor with end portions projecting from opposite sides of the driven member;
   B. a bracket adapted to be fixed to a stationary support;
   C. means which includes said axle, mounting said driven member on the bracket for rotation on its axis and for bodily motion relative to the bracket in said direction along said path;
   D. wedge means having opposite legs wedgingly confined between portions on the bracket and the end portions on said axle, to effect movement of the rotatable driven member bodily along said path and in said direction in consequence of movement of the wedge means relative to the bracket in one direction crosswise of said path; and
   E. spring means reacting between the bracket and said wedge means to at all times exert biasing force on the wedge means tending to move it in said one direction.

2. Means for adjustably supporting a rotatable driven member as set forth in claim 1, wherein the legs of the wedge means have inclined edges facing toward the end portions of the axle; and wherein shoes on said end portions of the axle are operatively interposed between the axle and said inclined edges of the legs on the wedge means.

3. Means for adjustably supporting a rotatable driven member as set forth in claim 1, wherein said wedge means is U-shaped and has a rounded bight portion from which said legs project; and wherein said spring means comprises a single tension spring engaged around the bight portion of the wedge means and having its opposite ends anchored to said bracket.

References Cited by the Examiner
UNITED STATES PATENTS

| 493,726 | 3/1893 | Ivey | 74—242.14 |
|---|---|---|---|
| 1,047,830 | 12/1912 | Nealy | 74—242.14 |
| 1,673,762 | 6/1928 | Chapman | 74—242.11 |
| 1,815,954 | 7/1931 | Opie | 74—242.11 |
| 2,541,080 | 2/1951 | Lyon | 74—242.8 |

DAVID J. WILLIAMOWSKY, *Primary Examiner.*

J. A. WONG, *Assistant Examiner.*